INVENTORS
ALVON R. COX
ALBERT E. HOSIER
BY Oldham & Oldham
ATTYS.

LIQUID PLASTISOL

INVENTORS
ALVON R. COX
BY ALBERT E. HOSIER

Oldham & Oldham
ATTYS.

United States Patent Office 3,055,054
Patented Sept. 25, 1962

3,055,054
MANUFACTURE OF HOLLOW PLASTIC ARTICLES AND ARTICLES PRODUCED THEREBY
Alvon R. Cox and Albert E. Hosier, Ashland, Ohio, assignors to The Faultless Rubber Company, Ashland, Ohio
Filed May 24, 1960, Ser. No. 31,482
17 Claims. (Cl. 18—26)

This invention relates to the manufacture of hollow articles from thermosetting plastic material and is especially useful in the manufacture of toy balls or other closed hollow articles.

It has been proposed heretofore to form hollow articles by pouring a mold cavity formed to the desired shape with a dispersion of thermosetting material such as plastisol, allowing some of the dispersion to gel over the cavity surfaces as by heating of the mold, pouring the ungelled excess material out of the mold and curing the article by heating the mold to thermosetting temperature. That process has been called "slush molding." Such a process as ordinarily practiced has the objectionable feature of some of the material being gelled unattached to the mold and contaminating the ungelled material. Also where the dispersion is subjected to continued pouring in the presence of the atmosphere some deterioration takes place. Furthermore, slush molding is accompanied by spill of the material about the apparatus and the floor.

The present invention has for an object to overcome the foregoing and other difficulties and to prevent waste of material, to provide an improved product, to provide for increased cleanliness.

These and other objects will appear from the following description and the accompanying drawings forming a part hereof.

Of the drawings:

FIG. 3 is a sectional view of one of the mold members in place on the drum with a deposit of plastisol thereon, parts being broken away.

FIG. 4 is a sectional view of a pair of mold members clamped together with the deposited material therein.

FIG. 5 is a fragmentary section to show the relation between the plastisol level and mold cavity as filled with plastisol.

Figure 1:
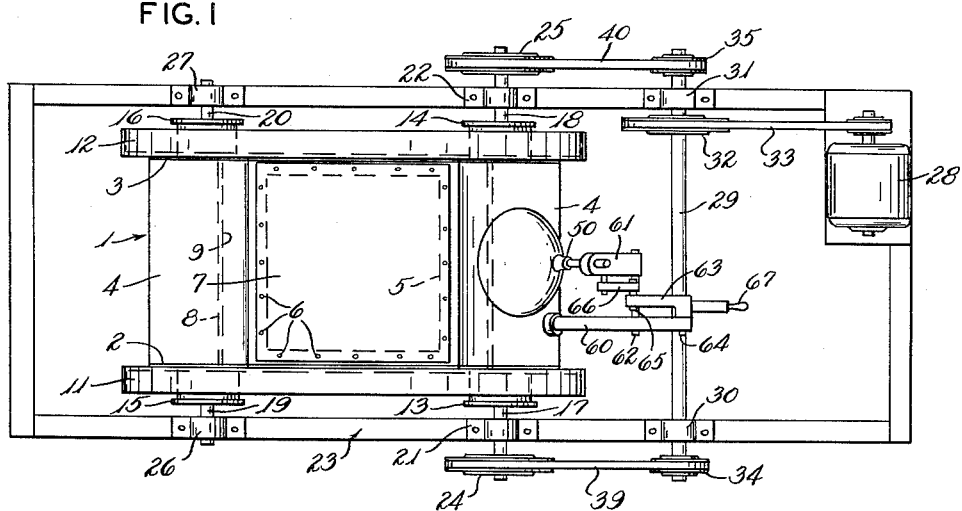
FIG. 1 is a plan view of an apparatus for depositing thermosetting material on mold members.

Referring to the drawings which show one embodiment of the invention, the numeral 1 designates a tumbling drum comprising a pair of similar hexagonal plates 2, 3 to which six rectangular plates 4 having each a side equal to a side of the hexagon are welded. The plates are welded to each other. At least one of the plates has a rectangular opening 5 cut therethrough and the margins thereabout are drilled at intervals to receive bolts or studs 6 whereby a plate 7 may be secured thereover. While only one plate 4 is shown as having an opening 5 and only one plate 7 is shown in the drawing, usually each plate 4 has such an opening and cover plate.

Within the drum, a tubular member 8 extends between the end plates 2 and 3 concentric with the axis of the drum and is welded thereto. This provides a cylindrical compartment 9 through which a heating fluid may be circulated to control temperature of the plastisol with a compartment 10 thereabout spaced from the plates 4. For rotating the drum about its horizontal axis, a pair of annular driving members 11, 12 are secured to the drum as by welding and driven cradle rollers 13, 14 and idler cradle rollers 15, 16 are mounted on stub shafts 17, 18, 19, 20 respectively, stub shafts 17, 18 are rotatively mounted in bearings 21, 22 secured to the frame 23 and have grooved pulleys 24, 25 secured thereto for driving the cradle rollers. Stub shafts 19, 20 are journalled in bearings 26, 27 also secured to the frame 23.

A motor 28 is mounted on the frame 23 and a jack shaft 29 is journalled in bearings 30, 31 on the frame 23. A pulley 32 on the jack shaft 29 is driven by a belt 33 from the motor and other pulleys 34, 35 on the jack shaft drive pulleys 24, 25 fixed respectively to stub shafts 17, 18 by means of belts 39, 40. The arrangement is such that the drum rests upon a driven cradle for rotating it at a slow speed and may be removed from the cradle at will.

According to the invention, hollow articles such as balls are formed by clamping concave mold members in sealed engagement with the plates 4 of the rotatable drum over openings through the drum and by rotation of the drum liquid thermosetting material such as polyvinyl plastisol is washed over the concave surfaces of the mold members and gelled thereon due to heat stored in the mold members. Two complementary mold members may then be clamped together to unite their deposits and subjected to further heating to thermoset the material. Referring to FIG. 4 which shows two complementary mold members with their deposits clamped together, the mold members 45, 46 each have a concave cavity 47 formed therein and terminating in a narrow land 48 at the parting line. This land is about one-sixteenth inch in width. The wall of the mold member is relatively thin at the parting line but increases progressively in thickness to a thick wide flange 49 spaced from the parting line and adapted to be seated against the plate 4 around the opening therethrough and also adapted by reason of its mass to store heat near the thin edge of the mold member for transfer to the thin edge. The mold members are also formed with a clamp engaging means such as the pad 50 central of the cavity area for engaging a clamp 51. The clamp and pad may be of any type, a C clamp being shown having a centering pin 52 and a centering screw 53 opposite thereto for engaging aligned depressions of the pads 50.

The plate 4 of the drum has an opening 55 larger than the lip 56 of the mold member and surrounded by a counterbore 57 in its outer face, in which a gasket 58 of silicone is seated for sealing against the flange 49 of the mold member. A heat insulating centering plate 59 of micarta is mounted on the plate 4 about the flange 49 for centering the mold member with opening 55 and to retain the sealing gasket while preventing heat loss.

For clamping the mold member in place on the plate 4, a post 60 is mounted on the plate 4, a clamping bar 61 is pivotally mounted at 62 on the bar and its free end is engageable over the pad 50, a toggle lever 63 is also pivotally mounted on the post 60 at 64 and its one end is pivotally connected at 65 with a toggle link 66 pivotally connecting it to the clamping bar 61 while its opposite end has a handle 67 for moving it from an off-center mold-freeing position to an on-center clamping position.

Figure 2:
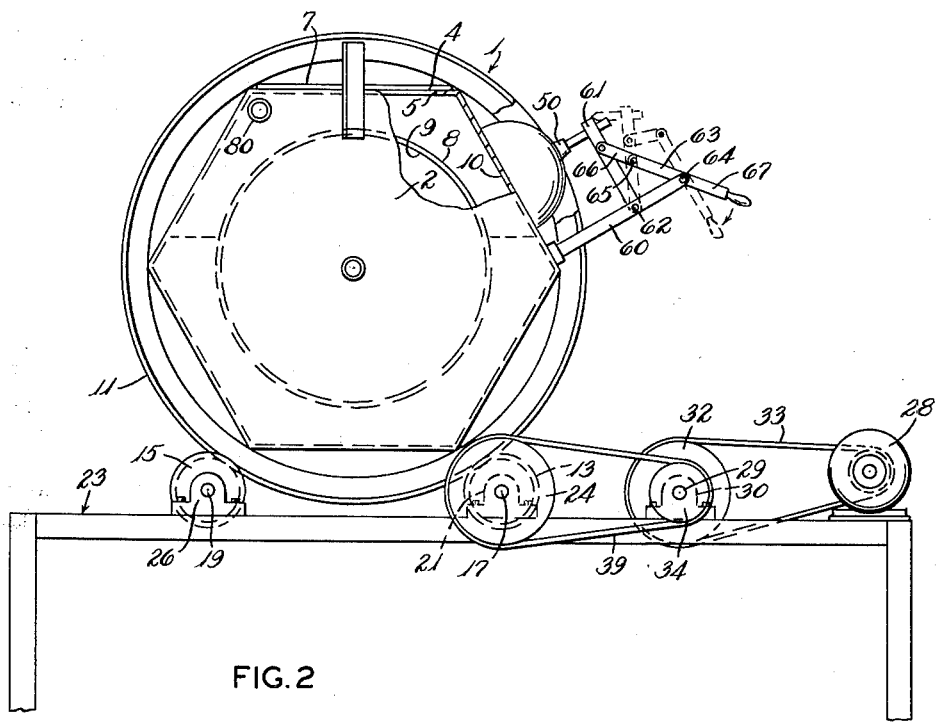
FIG. 2 is a side elevation thereof, parts being broken away and part shown in section.

As will be seen from FIG. 2, as the drum is rotated, the mold member will be washed with the plastisol and due to the fact that the mold is heated, the plastisol will gel thereon. The lip 56 of the mold member will be coated both on the cavity side and the outside as the plastisol may contact it in the space between the lip and the opening 55. To assist in retaining the deposit on the outer surface of the lip, a groove 68 is formed in the lip adjacent the flange 49. This enables the deposit to embrace the mold member and after mating mold members have been clamped and the article thermoset, aids in removing the excess material in an integral piece.

In practicing the method of the invention, the mold members are first heated to a gelling temperature of the plastisol or about 300 degrees Fahrenheit, as by placing them in an oven, a quantity of liquid thermosetting material such as plastisol is placed in the compartment 10 of the drum and the compartment 9 is filled with water or water is circulated therethrough at the temperature desired by rotary slip connections at the axis of the drum. The heated mold members are clamped over the openings in the plates 4 and the drum is rotated at a slow speed. The compartment 10 is not completely filled and the plastisol is poured or washed into and out of the mold cavities. As the molds are at the gelling temperature, the material deposits on the mold members due to transfer of heat from the mold to the contacting plastisol.

When the deposit has reached the desired thickness, rotation of the drum is discontinued and the mold members are removed therefrom, one at a time, at the top of the drum and replaced by other heated mold members, the quick-acting clamping means enabling quick placement and removal of the mold members.

As complementary mold members having deposits thereon are removed from the drum, they are assembled face to face and clamped together as shown in FIG. 4 and the excess material between the lips of the mold is forced outwardly as shown at 70 in FIG. 4. The deposited material is forced together and united at the lips of the mold members. The clamped mold members are then transferred to an oven or other heating means where the temperature is raised to the thermosetting temperature of the material, for example, about 350 degrees Fahrenheit for a time sufficient to thermoset the material. The molds are then removed from the heating means, the rind 70 of thermoset excess material is torn from the clamped mold members. The molds are then cooled and opened and the hollow articles are removed therefrom.

The drum is rotated either continuously or step by step, the latter being preferable as each mold member should be removed and replaced at the top of the drum. For this purpose the motor 28 may be started and stopped at regular intervals. Thus a deposit of plastisol may be obtained in a mold as it moves through a segment of, or a full circle on the apparatus, or the mold may be subjected to a series of rotations in the apparatus, as desired.

The lower portion of the tumbling drum, or carrier container 1 may be suitably enclosed, and may be heated, if required, to aid in setting up plastisol on the molds.

It will be seen that any desired hollow article may be made by practice of the invention, and such article may be inflatable and be made in two sections, or it may be a doll head, or a bulb, for example, completely made as a one piece unit.

It also should be noted that the special mounting of the mold 45 on the drum 1 positions the mold in insulated relation to the drum and the association of the groove 68 and silicone gasket 58 provides a terminal for deposit of plastisol. The silicone gasket does not adhere to thermosetting materials, such as polyvinyl chloride, and is heat resistant.

It should be understood that in making two parts for any article in the process and apparatus of the invention, it is important that the two halves or sections of the article, such as a ball or bulb, may be of different axial lengths, but each such section or part of the article desired must have at least substantially the same volume of material in each such part. This permits uniform operation of the apparatus of the invention and uniform feed of plastisol to the apparatus. Likewise, the molds can be interchangeably used on the drum, and satisfactory, uniform deposits or gels of plastisol material will be formed on the molds when processed by the apparatus and method of the invention.

FIG. 5 shows one example of the angular relationship necessary between the level of the liquid plastisol material and the mold member 46, for example, in order to avoid any possible entrapment of air in the mold cavity as the mold cavity is moved down into the liquid plastisol material. Various articles, such as basketballs, or other articles made by the process of the invention may have graining, or small irregular surfaces provided thereon and any quantity of air entrapped into the mold as it is dipped down into the plastisol will not completely work its way out of the mold cavity as the mold is turned down into the plastisol and accurate gelation of the plastisol onto the wall surfaces of the mold cavity to conform exactly thereto cannot be obtained. Hence, the shape of the molds and the height of the liquid plastisol must be correlated with each other so that the molds are brought down into the plastisol without any possible entrapment of air resulting in any portion of the mold as it is introduced into the liquid material.

One particularly important feature of the present invention is that it permits one to have a number of molds processed uniformly in that the first mold dipped into the plastisol will be the first one out of the plastisol to be removed therefrom and have its gelled deposit further processed for final fusing and finishing of the article, as required. When the drum 4 is in use, if it is rotated slowly, it can be continuously rotated and the molds be applied thereto and taken therefrom while the drum is rotating. With proper rotational speeds and pre-heat of the mold members, only one rotation of the drum with a given mold member thereon is required to obtain the desired gelling action for a uniform coating of plastisol deposit on the mold cavity surfaces. A plastisol feed hose can be secured to the aperture or opening 80 provided in the drum 4 to feed plastisol to the drum continuously. Obviously the fluid supplied to the center container 9 in the drum 4 can be used for either heating or cooling action, as required.

In some instances, it may be desirable to make the drum 4 narrower than that shown, and the molds or mold members used could be secured to side portions of the drum to be positioned thereon. Of course, this drum 4 may be provided with any desired number of sides depending upon the type of molds used, as long as the desirable no air entrapment angular relationship is obtained between the level of the liquid plastisol and the mold as it is turned or rotated down into full submersion into the liquid plastisol.

Another feature in the provision of the groove 68 in the mold members 45 and 46 is that the rib obtained on the gelled material and entering such groove aids in retaining this deposit of gelled plastisol in the mold cavity when the mold cavity is separated from the drum as the gelled material is quite hot at such time and has a minimum strength.

It also will be understood that the hollow article being produced by the process of the invention can be finished by use of any suitable means after the gelled deposit has been provided, for example, on a pair of complementary mold members 45 and 46. Any suitable heating and further processing of these molds and the deposits therein may be had in order to complete the fusing of the desired hollow article and the ultimate obtaining of the finished article by opening of the molds and releasing the finished article therefrom. Normally a positive cooling action is provided on the mold and finished article to permit the molds to be opened without any possible damage to the article produced, and with minimum delay.

From the foregoing it will be seen that a novel and improved process has been provided by the invention. This process will produce uniform deposits of gelled plastisol over the hemispherical mold cavity, and uniform thickness and mold deposit action can be obtained by repetitive or continual practice of the process of the invention. The apparatus is relatively uncomplicated, and once proper operating conditions are established, large numbers of uniformly made articles can be achieved at relatively low cost. Hence it is believed that the objects of the invention have been achieved.

While a certain embodiment and details have been shown to illustrate the invention, it will be understood that other embodiments of the invention may be made by one skilled in the art without departing from the scope of the invention as it is defined by the following claims.

What is claimed is:

1. The method of forming hollow articles from thermosetting plastic material which comprises securing mold members having mold cavities therein over openings of a rotatable drum containing a thermosetting material in liquid form with the mold cavities exposed to the liquid, the molds being at an elevated temperature, rotating the drum to wash the liquid material in and out of the mold cavities while gelling the liquid material on the surfaces of the cavities, securing a pair of mold members together to form a hollow article, heating the mold members and the deposits thereon to a thermosetting temperature to thermoset the deposits, cooling, and removing the article from the mold members.

2. In a method of forming hollow articles from thermosetting plastic material which comprises securing molds having mold cavities therein over openings of a rotatable drum containing a thermosetting material in liquid form with the mold cavities exposed to the liquid, the molds being at an elevated temperature, rotating the drum to wash the liquid materials into the mold cavities to gel the liquid material on the surfaces of the cavities, controlling the level of thermosetting material in the drum and the final angle of immersion of a mold cavity into the thermosetting material to avoid any entrapment of air in the cavity, and continuing the rotation of the drum to remove excess liquid material therefrom to obtain molds with uniform gelled deposits in the mold cavities.

3. The method of forming hollow articles from the thermosetting plastic material which comprises securing mold members having mold cavities therein over openings of a rotatable drum containing a thermosetting material in liquid form with the mold cavities exposed to the liquid, the molds being at an elevated temperature, rotating the drum to wash the liquid material into the mold cavity without any initial entrapment of air in the cavity and then to flow the liquid material out of the cavities, the liquid material gelling on the heated surfaces of the cavities when exposed thereto, removing the mold members from the drum, heating the mold members and the deposits thereon to a thermosetting temperature to thermoset the deposits, cooling the mold members, and removing the hollow article from the mold members.

4. The method of forming hollow articles from the thermosetting plastic material which comprises securing molds having mold cavities therein over openings of a rotatable drum containing a thermosetting material in liquid form with the mold cavities exposed to the liquid, the molds being at an elevated temperature controlling the level of the thermosetting material in the drum, rotating the drum to flow the liquid material into the mold cavities and completely fill such cavities by the initial contact of the liquid material with the molds, continuing the rotation of the molds to flow undeposited liquid material out of the molds, the liquid material gelling on the surfaces of the cavities when exposed thereto, removing the molds from the drum, clamping two of the molds face to face to unite the deposits thereon, heating the molds and the deposits thereon to a thermosetting temperature to thermoset the deposits, and cooling the molds and opening them to obtain the hollow article.

5. The method of forming hollow articles from thermosetting plastic material which comprises preheating mold members having mold cavities therein, securing the mold members over openings of a rotatable drum containing a thermosetting material in liquid form with the mold cavities exposed to the liquid, rotating the mold to wash the liquid material in and out of the cavities while gelling the liquid material on the surfaces of the cavities, removing the mold members from the drum, clamping two of the mold members face to face to unite the deposits thereon, and then heating the mold members and the deposits thereon to a thremosetting temperature to thermoset the deposits, tearing the excess material from the mold members, and removing the hollow articles from the mold members.

6. The method of forming hollow articles from thermosetting plastic material which comprises preheating mold members having mold cavities therein, securing the mold members over openings of a rotatable drum containing a thermosetting material in liquid form with the mold cavities exposed to the liquid, rotating the mold to wash the liquid material in and out of the cavities while gelling the liquid material on the surfaces of the cavities, removing the mold members from the drum, and then heating the mold members and the deposits thereon to a thermosetting temperature to thermoset the deposits.

7. The method of forming hollow articles from thermosetting plastic material which comprises preheating mold members having mold cavities therein, securing the mold members over openings of a rotatable drum containing a thermosetting material in liquid form with the mold cavities exposed to the liquid, rotating the mold to wash the liquid material in and out of the cavities while gelling the liquid material on the surfaces of the cavities, removing the mold members from the drum, clamping two of the mold members face to face to unite the deposits thereon, and then heating the mold members and the deposits thereon to a thermosetting temperature to thermoset the deposits.

8. The method of forming hollow articles from thermosetting plastic material which comprises preheating mold members having mold cavities therein, securing the mold members over openings of a rotatable drum containing a thermosetting material in liquid form with the mold cavities exposed to the liquid, rotating the mold to wash the liquid material in and out of the cavities while gelling the liquid material on the surfaces of the cavities, removing the mold members from the drum, clamping two of the mold members face to face to unite the deposits thereon, and then heating the mold members and the deposits thereon to a thermosetting temperature to thermoset the deposits, tearing the excess material from the mold members, and removing the hollow articles from the mold members.

9. That method of forming hollow articles from thermosetting plastic material which comprises preheating a mold, securing the mold to a carrier container containing a liquid thermosetting material in excess of that required to fill the mold cavity with the mold cavity and lands of the mold exposed to the liquid, moving the container through an arc in a direction extending from edge to edge of the mold to fill the mold cavity with liquid to gel some of the liquid material on the surfaces of the cavity and on the mold lands, removing the excess liquid by continued arcuate motion in the same direction, securing two molds with gelled material therein together with the lands thereof forced together, and heating the molds to thermoset the deposits therein.

10. That method of forming hollow articles from thermosetting plastic material which comprises, securing a mold to a carrier container containing a liquid thermosetting material in excess of that required to fill the mold cavity with the mold cavity and the lands of the mold exposed to the liquid, moving the carrier container at at least a substantially uniform speed through an arc to fill the mold cavity with liquid to gel some of the liquid material as at least a substantially uniformly thick layer on the surfaces of the cavity and lands of the mold, removing the excess liquid from the mold cavity by continuing the arcuate motion in the same direction at at least the substantially uniform rate, said gelled material extending over the lands of the mold and being physically interlocked therewith, securing two molds with gelled material therein together with the lands thereof forced together to produce plastic flow of the material on the lands both radially outwardly to form a surplus rind of material and inwardly to produce a reenforcing rib extending inwardly of the deposit, and heating the molds to thermoset the deposits therein.

11. That method of forming hollow articles from thermosetting plastic material which comprises, securing a mold to a carrier container containing a liquid thermosetting material in excess of that required to fill the mold cavity with the mold cavity exposed to the liquid, substantially uniformly moving the carrier container through an arc to fill the mold cavity with liquid to gel some of the liquid material as a substantially uniformly thick layer on the surfaces of the cavity, removing the excess liquid from the mold cavity by continued arcuate motion in the same direction at the said substantially uniform rate, securing two molds with gelled material therein together with the gelled layers in contact, and heating the molds to thermoset the deposits therein.

12. That method of forming hollow articles from thermosetting plastic material which comprises preheating a mold, securing the mold to a carrier container containing a liquid thermosetting material in excess of that required to fill the mold cavity with the mold cavity and lands of the mold exposed to the liquid, continuously supplying liquid thermosetting material to the carrier container, controlling the temperature of the liquid thermosetting material in the carrier container, moving the carrier container at a uniform speed through an arc to fill the mold cavity with liquid to gel some of the liquid material as a uniformly thick layer on the surfaces of the cavity and lands of the mold, removing the excess liquid from the mold cavity by continuing the arcuate motion in the same direction at a uniform rate, said gelled material extending over the lands of the mold, securing two molds with gelled material therein together with the lands thereof forced together to produce plastic flow of the material on the lands to form a reenforcing rib extending inwardly of the deposit, and heating the molds to thermoset the deposits therein.

13. The method of forming hollow articles from thermosetting plastic material which comprises preheating a mold member having a mold cavity therein, securing the mold member over an opening of a rotatable drum containing a thermosetting material in liquid form with the mold cavity and mold edges exposed to the liquid, rotating the drum to wash the liquid material into and out of the cavity while gelling the liquid material on the surfaces of the cavity and on the mold edges, said drum being rotated in one direction so that the leading portion of the mold both enters and leaves the liquid first to obtain a uniform thickness deposit on the mold cavity, securing a pair of similar mold members having gelled deposits thereon together with the gelled deposits in contact to form a hollow article, heating the mold members and the deposits thereon to a thermosetting temperature to thermoset the deposits, cooling, and removing the hollow article from the mold members.

14. In combination in apparatus of the class set forth, a rotatably positioned drum-like carrier container having a peripheral opening therein for receiving and retaining liquid plastisol, a mold having a mold cavity and mold lands at the margin of the cavity, said mold having an outwardly flanged section defining a plane parallel to and adjacent but spaced from said mold lands and having an annular recess at the face of said flange adjacent the mold cavity, said mold adjacent said mold lands tapering in wall thickness to a minimum wall thickness at said mold lands, said mold being adapted to be secured to said carrier container over and covering said opening with said mold cavity and mold lands and said recess exposed to the interior of said carrier container for deposit of material thereon, a heat insulating member contacting said mold to align it with said opening in said carrier container, clamp means carried by said carrier container and engaging said mold to secure it to said carrier container, and a heat resistant gasket positioned between said mold and said carrier container whereby said mold does not directly contact said carrier container but is insulated therefrom.

15. In combination in apparatus of the class set forth, a rotatably positioned drum-like carrier container for receiving and retaining liquid plastisol and having a peripheral opening therein, a mold having a mold cavity and mold lands at the margin of the cavity, said mold having an outwardly extending annular flange parallel to and adjacent but spaced from said mold lands and having a greater diameter than said mold lands, said mold having an annular recess at the connection of said flange to said mold on the face of said flange adjacent the mold cavity, said mold adjacent said mold lands tapering in wall thickness to a minimum wall thickness at said mold lands, a member operatively carried by said carrier container and having a centering opening therein to receive said mold to center it in said opening in said carrier container, said mold being adapted to be secured to said carrier container over and covering said opening with said mold cavity but to have said mold lands and said recess on the outer surfaces of said mold exposed to the interior of said carrier container for deposit of material thereon but with deposit of material terminating at said recess, clamp means carried by said carrier container and engaging said mold to secure it to said carrier container, and a heat resistant gasket positioned between said mold and said carrier container, plastisol material deposited on said mold forming a unitary article over said mold cavity surface and extending over said mold lands to and being seated in said recess to aid in securing the article to said mold.

16. In combination in apparatus of the class set forth, substantially cylindrical container means forming radially spaced inner and outer substantially cylindrical walls and inner and outer containers, said container means having an opening in said outer wall and a chamber for receiving liquid plastisol formed intermediate said inner and outer walls and communicating with said opening, a mold having a mold cavity operatively secured to said container means over and sealing around said opening with said mold cavity exposed to the interior of said chamber for deposit of plastisol material thereon, means connected to said container means for supply of liquid plastisol to said chamber, and means journalling said container means for rotation on its longitudinal axis to wash liquid plastisol into and out of said cavity for deposit therein.

17. In combination in apparatus of the class set forth, substantially cylindrical container means forming radially spaced inner and outer substantially cylindrical walls, said outer wall having an opening therein, said container means having a chamber for receiving liquid plastisol formed intermediate said inner and outer walls and communicating with said opening, a mold having a mold cavity operatively secured to said container means over and sealing around said opening with said mold cavity exposed to the interior of said container means for deposit of material thereon, liquid plastisol being present in but not completely filling said chamber, said inner wall of said container means forming an enclosure in which temperature control liquid can be received, and means journalling said container means for rotation on its longitudinal axis to wash liquid plastisol into and out of said cavity for deposit therein.

References Cited in the file of this patent

UNITED STATES PATENTS

| | | |
|---|---|---|
| 1,400,146 | Eggers et al. | Dec. 13, 1921 |
| 1,531,505 | Roberts | Mar. 31, 1925 |
| 1,566,568 | Williams | Dec. 22, 1925 |
| 1,659,399 | Faber | Feb. 14, 1928 |
| 1,949,502 | Szegvari | Mar. 6, 1934 |
| 2,081,777 | Talalay | May 25, 1937 |
| 2,125,080 | Merrick | July 26, 1938 |
| 2,208,230 | Rubissow | July 16, 1940 |
| 2,324,974 | Greenup | July 20, 1943 |
| 2,448,640 | Weston | Sept. 7, 1948 |
| 2,476,395 | Williams | July 19, 1949 |